United States Patent
Mizuno et al.

[11] Patent Number: 6,159,885
[45] Date of Patent: *Dec. 12, 2000

[54] ALUMINA-BASED SINTERED MATERIAL

[75] Inventors: Ken-ichi Mizuno, Nagoya; Yoshihiro Yamamoto, Nishikasugai-gun; Toru Shimamori, Kani; Kazuhisa Itakura, Komaki, all of Japan

[73] Assignee: NGK Spark Plug Co., Ltd., Aichi, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/998,384

[22] Filed: Dec. 24, 1997

[30] Foreign Application Priority Data

Dec. 26, 1996 [JP] Japan .................................. 8-358722
Dec. 3, 1997 [JP] Japan .................................. 9-350105

[51] Int. Cl.$^7$ ............................................ C04B 35/10
[52] U.S. Cl. ........................ 501/127; 501/128; 501/153
[58] Field of Search .................... 501/127, 128, 501/153

[56] References Cited

U.S. PATENT DOCUMENTS 4,601,991  7/1986  Ando et al. ........................ 501/153
5,424,257  6/1995  Schat et al. ........................ 501/127

FOREIGN PATENT DOCUMENTS 0 738 697  10/1996  European Pat. Off. .
0 808 811  11/1997  European Pat. Off. .
53-120176  10/1978  Japan .
55-3320  1/1980  Japan .
4-293290  10/1992  Japan .
9-52758  2/1997  Japan .

OTHER PUBLICATIONS

G. Richards "Alumina Ceramics" Transactions & Journal of the British Ceramic Society, vol. 80, No 4, (1981) pp. 120–124.

Primary Examiner—Paul Marcantoni
Attorney, Agent, or Firm—Sughrue, Mion, Zinn, Macpeak & Seas, PLLC

[57] ABSTRACT

A homogeneous alumina-based sintered material having excellent grindability, low porosity and high flexural strength, and which is free of color unevenness and fluctuations in density. Predetermined amounts of $Al_2O_3$ powder, MgO powder, $CaCO_3$ powder and $SiO_2$ powder are measured out, and then mixed with stirring in a ball mill. The mixture is granulated using a spray dryer, and then hydrostatically pressed to obtain a molded product having a predetermined shape. Subsequently, the molded product is stored and sintered at a temperature of 1,550° C. to 1,650° C., particularly 1,600° C. to 1,650° C. under atmospheric pressure for 2 hours. As a result, an alumina-based sintered material having a 50 percent cumulative grain size distribution in diameter of from 4 to 15 μm, a 90 percent grain diameter of two to three times the 50 percent grain diameter, and a porosity of not more than 5% can be obtained. The alumina-based sintered material thus obtained exhibits a maximum load current during grinding of not more than 1.0 A/mm, particularly not more than 0.5 A/mm, and a four-point flexural strength of not less than 300 MPa, thus providing excellent grindability as well as high strength.

20 Claims, 1 Drawing Sheet

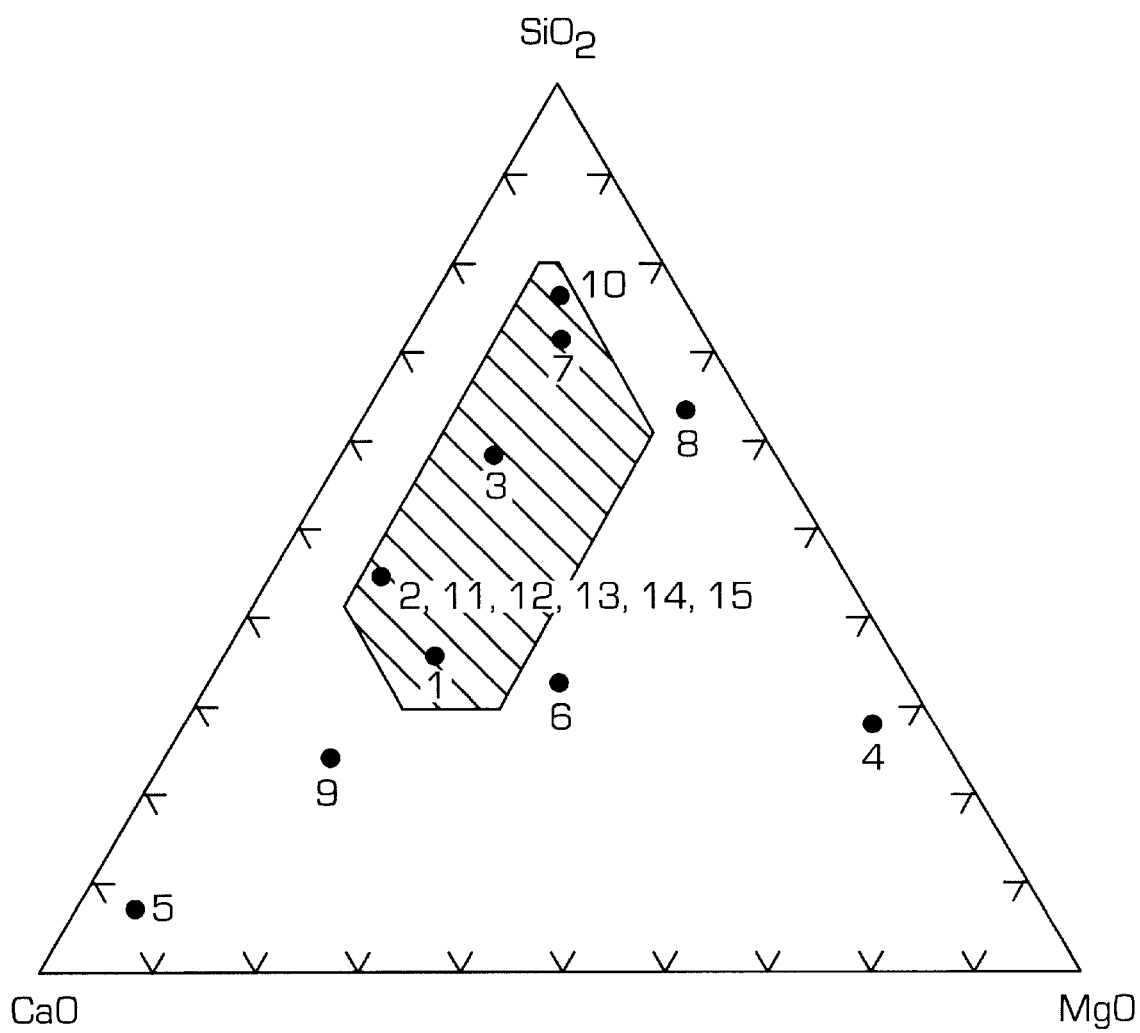

ALUMINA-BASED SINTERED MATERIAL

FIELD OF THE INVENTION

The present invention relates to a uniformly dense and homogeneous alumina-based sintered material having excellent grindability and strength such as flexural strength, and which is free from color unevenness and fluctuations in density. The alumina-based sintered material of the present invention can be used to make ceramic parts for semiconductor fabrication equipment such as a wafer chuck, a conveyor jig, a polishing plate, various chamber parts and a wafer board, or to make ceramic parts for ordinary industrial machines. The alumina-based sintered material of the present invention can also be used as a ceramic part requiring particularly precise working and corrosion resistance, such as a precision working jig for producing a magnetic head.

BACKGROUND OF THE INVENTION

Because of alumina's many advantages, and more particularly, because it is highly inert to oxidizing atmospheres, has excellent acid resistance and alkali resistance and is inexpensive, alumina finds wide application as a common structural material. Furthermore, alumina has been used for purposes having more demanding requirements. In general, alumina having a coarser sintered structure has better grindability and polishability, however, the strength of the resulting alumina material is lowered. On the other hand, alumina having a finer sintered structure provides a higher strength alumina material, however, the grindability and polishability of the alumina is lowered. Thus, it is generally difficult to provide alumina having both the desired grindability or polishability and strength at the same time.

High purity alumina having an alumina content of not less than 98% by weight, particularly not less than 99% by weight, has high chemical inertness and rigidity and excellent electrical insulating properties. Thus, high purity alumina is often used for making parts for semiconductor fabrication equipment. In more detail, high purity alumina often finds application as a jig for polishing, chemical treatment and plasma treatment of silicon wafers. Such a jig requires high dimensional accuracy. In general, however, ceramics shrink at the sintering step. Accordingly, if used as a part requiring high dimensional accuracy such as the foregoing jig, ceramics which have been sintered must first be subjected to grinding.

In order to grind ceramics, a diamond grinding wheel is generally used. In more detail, ceramics are subjected to cylindrical, surface, inner diameter, profile or creep feed grinding using a wet process. However, a diamond grinding wheel is very expensive. Furthermore, in the case of ceramics, cracking during working and the roughness of the finished surface have a greater effect on the properties of the resulting product as compared with metal. Thus, ceramics cannot be subjected to heavy-duty grinding. Accordingly, the grinding of ceramics takes a prolonged period of time. When combined with the expense of the diamond grinding wheel, the grinding step incurs a very high cost. As a result, the resulting jig or other products are made more expensive.

SUMMARY OF THE INVENTION

It is therefore an object of the present invention to provide an alumina-based sintered material having excellent grindability, high density, low porosity, high flexural strength and other mechanical properties, and which is free of color unevenness and fluctuations in density. Unlike conventional alumina-based sintered materials in which a finer structure generally provides higher strength but poorer grindability, the alumina-based sintered material of the present invention exhibits in combination excellent grindability and high strength.

The grindability of a ceramic depends on its strength. Thus, grindability is improved as the strength of the ceramic is lowered. In general, ceramics having a large average grain diameter and hence a coarse structure have a reduced strength and enhanced grindability. Furthermore, ceramics having a fine structure generally exhibit enhanced strength. However, abnormally grown grains, if any occur in the structure, act as a fracture origin that deteriorate both grindability and strength. Accordingly, in order to obtain ceramics having excellent grindability and high strength, it is necessary to produce a sintered product having a structure as coarse as possible yet free of abnormally grown grains. In the case of alumina-based sintered materials, the kind and content of sintering aids to be incorporated therein must be taken into account. This is because the structure of alumina-based sintered materials is greatly influenced by these sintering aids.

The first aspect of the present invention concerns an alumina-based sintered material comprising MgO in an amount of not more than 1% by weight (excluding 0% by weight), preferably from 0.005 to 1% by weight, CaO in an amount of from 0.02 to 1% by weight, $SiO_2$ in an amount of from 0.02 to 1% by weight and $Al_2O_3$ in an amount of at least 98% by weight, having an $SiO_2$ content ratio of less than 80 parts by weight based on 100 parts by weight of the sum of the weight of MgO, CaO and $SiO_2$, a 50 percent cumulative grain size distribution in diameter of from 4 to 15 μm, a 90 percent diameter of not more than three times the 50 percent diameter, a maximum load current during grinding of not more than 1.0 A/mm, and a porosity of not more than 5%.

Method for Measuring Maximum Load Current During Grinding

A surface grinding machine (e.g., PSG-52DX, manufactured by Okamoto Machine Tool Works., Ltd.) is used. A voltage of 220 V is applied to the grinding motor which is connected to an ammeter. The load current that is developed when grinding is measured under the following conditions. The load current is obtained by dividing the measured current by the width of the wheel.

Grinding machine: Precision surface grinding machine
Grinding method: Creep feed surface grinding
Wheel: Resin bond diamond wheel (grain size: #170; outer periphery: 205 mm; wheel width: 10 mm)
Number of wheel revolutions: 3,600 rpm
Table feed rate: 60 mm/min.
Depth of cut: 3 mm/pass
Grinding distance: 30 mm The second aspect of the present invention concerns an alumina-based sintered material comprising MgO in an amount of not more than 0.4% by weight (excluding 0% by weight), preferably 0.005 to 0.4% by weight, CaO in an amount of from 0.02 to 0.7% by weight, $SiO_2$ in an amount of from 0.02 to 0.8% by weight and $Al_2O_3$ in an amount of at least 98% by weight, having an $SiO_2$ content ratio of less than 80 parts by weight based on 100 parts by weight of the sum of the weight of MgO, CaO and $SiO_2$, a 50 percent cumulative grain size distribution in diameter of from 6 to 12 μm, a 90 percent diameter of not more than three times the 50 percent diameter, a maximum load current during grinding of not more than 0.5 A/mm as determined by the method defined above, a porosity of not more than 3%, and a four-point flexural strength of not less than 300 MPa as determined according to JIS R1601 (1995).

In the first and second aspects of the present invention, the $Al_2O_3$ content can be adjusted as defined in the following third aspect of the present invention to invariably obtain an alumina-based sintered material having superior grindability. That is, the third aspect of the present invention concerns an alumina-based sintered material according to the first and second aspects of the present invention, comprising $Al_2O_3$ in an amount of not less than 99.3% by weight.

BRIEF DESCRIPTION OF THE DRAWING

By way of example and to make the description more clear, reference is made to the accompanying drawing in which:

FIG. 1 is a graph illustrating the content of MgO, CaO and $SiO_2$ in various alumina-based sintered materials.

DETAILED DESCRIPTION OF THE INVENTION

In the first aspect of the present invention, if the MgO content exceeds 1% by weight (hereinafter referred to as "%") based on 100% of the alumina-based sintered material, the resulting effect of inhibiting grain growth can be so great as to produce a fine structure that deteriorates the grindability of the alumina-based sintered material. If the CaO content and $SiO_2$ each is less than 0.02%, the resulting sinterability is deteriorated, producing a fine structure. On the contrary, if the CaO content exceeds 1%, the resulting effect of inhibiting the grain growth can be so great as to produce a fine structure that deteriorates the grindability of the alumina-based sintered material. Furthermore, if the $SiO_2$ content exceeds 1%, abnormal growth of alumina grains can easily occur, thereby reducing the strength of the alumina-based sintered material. Moreover, if the $SiO_2$ content ratio (i.e., $SiO_2/(MgO+SiO_2+CaO)$) is not less than 80 parts by weight, a denatured layer is produced on the surface of the sintered material during sintering, to thereby impede sintering. The resulting sintered material exhibits considerably reduced strength. Furthermore, a tendency for abnormal grain growth is observed. In addition, the production of the denatured layer not only causes color unevenness and fluctuations in density that deteriorate the external appearance of the sintered material, but also impairs the homogeneity of the sintered material.

In the second aspect of the present invention, the MgO, CaO and $SiO_2$ contents are adjusted so as to be not more than 0.4%, from 0.02 to 0.7% and from 0.02 to 0.8%, respectively. Furthermore, the $SiO_2$ content ratio (i.e., $SiO_2/(MgO+SiO_2+CaO)$) is adjusted to less than 80 parts by weight as in the first aspect of the present invention. The alumina-based sintered material having an oxide content falling within the above defined ranges exhibits a maximum load current during grinding of not more than 0.5 A/mm, a flexural strength of not less than 300 MPa and a porosity of not more than 3%. Thus, an alumina-based sintered material having superior properties can be obtained.

The cumulative grain size distribution is further described below.

The alumina-based sintered material is mirror-polished. The mirror-polished surface of the sintered material is then observed under a scanning electron microscope. The diameter of the sintered grains is then measured over a field of view or a photograph is taken thereof. For determining the grain diameter, the maximum distance across the grain over a field of view or a photograph thereof is measured. The number of grains thus measured is at least 100. If the shape and dimension of the grains are not well defined, the alumina-based sintered material which has been mirror-polished is then etched. In the cumulative grain size distribution, the grain diameter at or below which half of all the grains thus measured are distributed is the 50 percent grain diameter, and the grain diameter at or below which 90% of all the grains thus measured are distributed is the 90 percent grain diameter.

In the first aspect of the present invention, if the 50 percent grain diameter as defined above is less than 4 µm, the resulting alumina-based sintered material has a fine structure that increases strength but deteriorates grindability. On the contrary, if the 50 percent grain diameter exceeds 15 µm, the resulting alumina-based sintered material ha s a coarse structure that enhances grindability but deteriorates strength. Even when the 50 percent grain diameter falls within a range of from 4 to 15 µm, if the 90 percent grain diameter as defined above is three or more times the 50 percent grain diameter, the resulting alumina-based sintered material exhibits reduced strength as well as deteriorated grindability. Namely, although the bulk of the sintered material has a structure which is sufficiently coarse so as to maintain high strength, abnormally grown oversized grains occur. This in turn gives rise to a fracture origin that causes a reduction in strength.

In the second aspect of the present invention, the 50 percent grain diameter as defined above is preferably from 6 to 12 µm, particularly from 6 to 10 µm. When the 50 percent grain diameter falls within the above defined range, the 90 percent grain diameter is preferably not more than three times, particularly from two to three times, and more particularly from 2 to 2.7 times the 50 percent grain diameter. When the various grain diameters and the relationship between the various grain diameters fall within the above defined ranges, an alumina-based sintered material having, in combination, a grindability as good as that obtained with a maximum load current during grinding of not more than 0.5 A/mm and a flexural strength of not less than 300 MPa can be obtained.

Furthermore, as defined in the following fourth aspect of the present invention, the maximum load current during grinding can be reduced to not more than 0.3 A/mm, particularly to not more than 0.28 A/mm, and more particularly to not more than 0.25 A/mm while maintaining a flexural strength of not less than 320 MPa. The fourth aspect of the present invention concerns an alumina-based sintered material according to any one of the first to third aspects of the present invention, which exhibits a maximum load current during grinding of not more than 0.3 A/mm as determined above and a four-point flexural strength of not less than 320 MPa as determined according to JIS R1601 (1995). Thus, in accordance with the present invention, an alumina-based sintered material having such excellent grindability and great strength can be obtained. The value of the load current as defined above indicates whether or not the grindability is good. In other words, the smaller the value of the load current, the better the grindability.

In the present invention, the foregoing composition can be sintered at a temperature of from 1,550° C. to 1,650° C., and particularly from 1,600° C. to 1,650° C. to obtain an alumina-based sintered material having a density such that the porosity is not more than 5%, particularly not more than 3%, and more particularly not more than 2%. Thus, the alumina-based sintered material obtained according to the present invention has both high density and great strength. The alumina-based sintered material of the present invention also exhibits very excellent grindability. The alumina-based sintered material having in combination such excellent grindability and strength can be obtained by adjusting the 50 percent grain diameter of the cumulative grain size distribution and by adjusting the ratio of the 50 percent grain diameter to the 90 percent grain diameter in accordance with the present invention.

The MgO, CaO and. $SiO_2$ contents and the proportion of $SiO_2$ in these oxides are as defined above. In the alumina-based sintered material according to the present invention, the $Al_2O_3$ content is preferably at least 98%, particularly not less than 98.5%, and more particularly not less than 99% by weight based on 100% by weight of the sintered material. If the $Al_2O_3$ content falls below 98%, the desired alumina-based sintered material having high rigidity and various other excellent properties such as electrical insulating properties cannot be obtained. If the $Al_2O_3$ content is not less than 99.3% by weight, the desired alumina-based sintered material having excellent grindability can be invariably obtained.

The present invention will be further described in the following Examples, but the present invention should not be construed as being limited thereto.

EXAMPLES 1–15, COMPARATIVE EXAMPLES 1–8

(1) Production of Alumina-Based Sintered Material

A powdered alumina (purity: not less than 99.9%) having an average grain diameter of 0.68 $\mu$m and containing as impurities CaO in an amount of from 100 to 300 ppm and $SiO_2$ in an amount of from 100 to 800 ppm, MgO, $CaCO_3$, which was converted to CaO, and $SiO_2$ (purity: not less than 99.9% for each oxide) having an average grain diameter of not more than 2 $\mu$m as sintering aids were measured out in amounts such that the proportions set forth in Tables 1 and 2 were attained. $CaCO_3$ was blended in an amount to provide a CaO content as set forth in Tables 1 and 2. The $Al_2O_3$ content as set forth in Tables 1 and 2 included the CaO and $SiO_2$ contents incorporated as impurities.

The foregoing oxide powders were charged into a ball mill. An appropriate amount of an organic binder and water were then charged into the ball mill. The mixture was then stirred with 20 mm$\phi$ alumina balls (purity: not less than 99.5%) for 16 hours. Thereafter, the material was dried using a spray dryer, and then granulated. Subsequently, the material thus granulated was hydrostatically pressed to prepare a molded product having a size of 50×50×20 mm (thickness). Thereafter, the molded product was stored and sintered at a temperature as set forth in Tables 1 and 2 under atmospheric pressure for 2 hours.

(2) Measurement of Grain Diameter

The sintered product thus obtained was then mirror-polished. A photograph of the surface structure of the sintered product thus mirror-polished was then taken using a scanning electron microscope. Using the photograph, the maximum distance across each of 200 to 300 grains was measured. When the data are plotted, with grain diameter as an ordinate and the accumulated number of grains having a diameter ranging from the smallest diameter to a predetermined diameter as the abscissa, the grain diameter on the abscissa corresponding to 50% of the total number of grains measured on the ordinate is the 50 percent grain diameter, and the grain diameter on the abscissa corresponding to 90% of the total number of grains measured on the ordinate is the 90 percent grain diameter. The 50 percent grain diameter and 90 percent grain diameter measured as described above are set forth in Tables 1 and 2. The figure in parentheses in the 90 percent grain diameter column indicates the ratio of the 90 percent grain diameter to the 50 percent grain diameter.

(3) Measurement of Density

The density of the sintered product thus obtained was then measured by Archimedes' method. The porosity of the sintered product was then determined from the measured density and the theroletical density. For determining the fluctuation in density, five specimens of the sintered product were measured. If the difference between the maximum density and the minimum density is not more than 0.02 g/cm$^3$, it is considered that there is substantially no fluctuation in density. If the difference exceeds the above defined value, it is considered that some fluctuation in density occurs.

(4) Preparation of Specimen and Evaluation of Properties

The sintered product was cut, and then surface-ground to prepare a specimen (3×4×35 mm) for measuring flexural strength and a specimen (20×30×10 mm) for evaluating grindability.

1) Flexural strength: Four-point flexural strength measurement according to JIS R1601 (1995), determined at ordinary temperature (23° C.)

2) Grindability: A surface grinding machine is used. A voltage of 220 V is applied to the wheel motor which is connected to an ammeter. The load current developed when grinding is effected under the following conditions is measured. The load current is obtained by dividing the measured current by the width of the wheel.

Grinding machine: Precision surface grinding machine

Grinding method: Creep feed surface grinding

Wheel: Resin bond diamond wheel (grain size: #170; outer periphery: 205 mm; wheel width: 10 mm)

Number of wheel revolutions: 3,600 rpm

Table feed rate: 60 mm/min.

Depth of cut: 3 mm/pass

Grinding distance: 30 mm

The porosity, maximum load current and flexural strength data are set forth in Tables 1 and 2. In Table 1, the symbol ** indicates that the data deviates from the ranges defined in the second aspect of the present invention. In Table 2, the symbol * indicates that the data deviates from the ranges defined in the first and third aspects of the present invention. The color unevenness was visually evaluated.

TABLE 1

| Example No. | Composition (wt %) | | | | Sintering temperature | % Porosity | 50% grain diameter ($\mu$m) | 90% grain diameter ($\mu$m) | Max. load current (A/mm) | Strength (MPa) |
|---|---|---|---|---|---|---|---|---|---|---|
| | $Al_2O_3$ | MgO | CaO | $SiO_2$ | | | | | | |
| 1 | 99.75 | 0.05 | 0.11 | 0.09 | 1,650 | 2 | 10 | 25(2.5) | 0.28 | 350 |
| 2 | 99.89 | 0.01 | 0.05 | 0.05 | 1,625 | 1 | 8 | 18(2.3) | 0.23 | 320 |

TABLE 1-continued

| Example No. | Composition (wt %) | | | | Sintering temperature | % Porosity | 50% grain diameter (μm) | 90% grain diameter (μm) | Max. load current (A/mm) | Strength (MPa) |
|---|---|---|---|---|---|---|---|---|---|---|
| | Al₂O₃ | MgO | CaO | SiO₂ | | | | | | |
| 3 | 99.30 | 0.10 | 0.20 | 0.40 | 1,650 | 1 | 6 | 15(2.5) | 0.30 | 340 |
| 4 | 98.95 | 0.70** | 0.05 | 0.30 | 1,600 | 2 | **4 | 9(2.3) | **0.80 | 400 |
| 5 | 99.20 | 0.05 | 0.70 | 0.05 | 1,600 | 2 | 7 | 20(2.9) | **0.60 | **270 |
| 6 | 98.50 | 0.50** | 0.50 | 0.50 | 1,600 | 2 | 8 | 20(2.5) | **0.55 | 310 |
| 7 | 98.95 | 0.15 | 0.15 | 0.75 | 1,625 | 2 | 9 | 22(2.4) | 0.25 | 330 |
| 8 | 99.04 | 0.30 | 0.06 | 0.60 | 1,625 | 1 | 7 | 17(2.4) | 0.32 | 330 |
| 9 | 99.00 | 0.15 | 0.60 | 0.25 | 1,625 | 1 | 8 | 21(2.6) | 0.35 | 340 |
| 10 | 99.50 | 0.06 | 0.06 | 0.38 | 1,625 | 2 | 11 | 28(2.5) | 0.24 | 320 |
| 11 | 99.50 | 0.05 | 0.225 | 0.225 | 1,625 | 1 | 8 | 22(2.8) | 0.26 | 330 |
| 12 | 98.50 | 0.15 | 0.675 | 0.675 | 1,600 | 1 | **4 | 8(2.0) | 0.46 | 380 |
| 13 | 99.00 | 0.10 | 0.45 | 0.45 | 1,600 | 1 | **5 | 12(2.4) | 0.38 | 360 |
| 14 | 99.30 | 0.07 | 0.315 | 0.315 | 1,625 | 1 | 7 | 19(2.7) | 0.29 | 340 |
| 15 | 99.80 | 0.02 | 0.09 | 0.09 | 1,625 | 1 | 9 | 25(2.8) | 0.24 | 320 |

TABLE 2

| Comp. Example No. | Composition (wt %) | | | | Sintering temperature | % Porosity | 50% grain diameter (μm) | 90% grain diameter (μm) | Max. load current (A/mm) | Strength (MPa) |
|---|---|---|---|---|---|---|---|---|---|---|
| | Al₂O₃ | MgO | CaO | SiO₂ | | | | | | |
| 1 | 97.70 | *1.10 | *1.10 | 0.10 | 1,600 | 2 | *3 | 8(2.7) | *1.25 | 410 |
| 2 | 98.10 | 0.23 | 0.02 | *1.65 | 1,650 | 4 | *16 | 35(2.2) | 0.20 | 180 |
| 3 | 97.28 | 0.02 | 0.50 | *2.20 | 1,625 | 2 | 8 | *25(3.1) | 0.35 | 190 |
| 4 | 97.00 | *2.00 | 0.20 | 0.80 | 1,625 | 3 | *2 | *12(6.0) | *1.40 | 470 |
| 5 | 95.00 | *3.00 | 1.00 | 1.00 | 1,600 | 4 | *2 | *10(5.0) | *1.40 | 450 |
| 6 | 99.50 | 0.03 | 0.03 | *0.44 | 1,625 | 5 | 14 | 34(2.4) | 0.24 | 240 |
| 7 | 98.10 | 0.05 | 0.05 | *0.80 | 1,600 | 4 | 14 | 31(2.2) | 0.23 | 250 |
| 8 | 99.50 | 0.05 | 0.05 | *0.40 | 1,625 | 4 | 13 | 30(2.3) | 0.23 | 270 |

Comparative Examples 1 to 5 exhibited neither color unevenness nor fluctuation in density, whereas Comparative Examples 6 to 8 exhibited each of these to some degree.

It can be seen from the results of Table 1 that the alumina-based sintered materials of Examples 1 to 3, 7 to 11 and 14 to 15, which fall within the scope of the second aspect of the present invention, exhibited a maximum load current during grinding as small as from 0.23 to 0.35 A/mm and a flexural strength of from 320 to 350 MPa. Thus, these alumina-based sintered materials exhibited excellent grindability and high strength. Furthermore, the alumina-based sintered material of Example 4 had a high MgO content and a 50 percent grain diameter of 4 μm, small enough to provide a fine structure. As a result, the alumina-based sintered material of Example 4 exhibited a strength as great as 400 MPa but also a maximum load current as great as 0.80 A/mm. This indicates deteriorated grindability as compared with the other examples.

The alumina-based sintered material of Example 5, which had a high CaO content also had a fine structure and thus exhibited deteriorated grindability, although not as low as that of Example 4. The alumina-based sintered material of Example 5 also had a 90 percent grain diameter of 2.9 times the 50 percent grain diameter, which is close to the upper limit of the desired 90 percent grain diameter. Accordingly, some abnormally grown grains occurred, resulting in a fracture origin which caused a slight decrease in strength. Furthermore, the alumina-based sintered material of Example 6 had a large content of the three kinds of auxiliary ingredients in total. As a result of the mutual interaction of these auxiliary ingredients, the alumina-based sintered material of Example 6 had moderate grindability as well as strength.

Moreover, in accordance with Examples 10, 11, 14 and 15 each having an Al₂O₃ content of not less than 99.3% by weight, particularly excellent grindability was invariably obtained. On the contrary, Examples 12 and 13 having a relatively small Al₂O₃ content exhibited markedly deteriorated grindability. Thus, Examples 11 to 15 confirm the effect of the third aspect of the present invention. It is thus seen that alumina-based sintered materials according to the present invention, particularly those falling within the scope of the second aspect of the present invention, exhibit in combination excellent grindability and great strength, although slightly differing from example to example. None of the examples of the present invention exhibited color unevenness or fluctuation in density.

On the other hand, Table 2 shows that the alumina-based sintered material of Comparative Example 1 exhibited a 50 percent grain diameter of 3 μm, which was below the lower limit of the desired 50 percent grain diameter, a maximum load current of 1.25 A/mm and a strength of 410 MPa, demonstrating that it had great strength but deteriorated grindability. Furthermore, the alumina-based sintered material of Comparative Example 2 exhibited a 50 percent grain diameter of 16 μm, which exceeded the upper limit of the desired 50 percent grain diameter, and was made of relatively coarse grains. Therefore, the alumina-based sintered material of Comparative Example 2 exhibited a maximum load current of 0.20 A/mm and a strength of 180 MPa, demonstrating that it had excellent grindability but a relatively reduced strength. Moreover, the alumina-based sintered material of Comparative Example 3, which had a 50 percent grain diameter falling within the desired range but had a 90 percent grain diameter of more than three times the 50 percent grain diameter, exhibited a relatively reduced strength due to the occurrence of abnormally grown grains.

The sintering materials of Comparative Examples 4 and 5 were greatly affected by the grain growth inhibiting effect of MgO and CaO. The resulting sintered product was made of fine grains having a 50 percent grain diameter of 2 μm. Therefore, the alumina-based sintered materials of Comparative Examples 4 and 5 exhibited very high strength but a maximum load current as high as 1.40 A/mm, indicating deteriorated grindability. Furthermore, the alumina-based sintered materials of Comparative Examples 6 to 8, which had an $SiO_2$ content ratio (i.e., $SiO_2/(MgO+SiO_2+CaO)$) outside the scope of the invention, had a 50 percent grain diameter close to its upper limit, a relatively high porosity and slightly reduced strength. These sintered products further showed some color unevenness and fluctuation in density.

FIG. 1 is a graph illustrating the content of MgO, CaO and $SiO_2$ in the alumina-based sintered materials of the examples of the present invention. In FIG. 1, the shaded area indicates compositions falling within the scope of the second aspect of the present invention, and particularly, comprising MgO, CaO and $SiO_2$ in amounts that can provide an alumina-based sintered material having superior properties according to the fourth aspect of the present invention. In more detail, the contents of MgO, CaO and $SiO_2$ range from 0.08 to 0.3, from 0.1 to 0.5 and from 0.3 to 0.8 (0.8 excluded), respectively, per 1 part of the sum of the MgO, CaO and $SiO_2$ contents. In other words, alumina-based sintered materials having a composition according to the second aspect of the present invention with MgO, CaO and $SiO_2$ contents falling within the foregoing specific ranges exhibit particularly excellent properties.

Thus, when the composition, the 50 percent grain diameter of the cumulative grain size distribution, the ratio of the 90 percent grain diameter to the 50 percent grain diameter, etc., are specified in accordance with the first aspect of the present invention, an alumina-based sintered material having excellent grindability, high density, high strength, and which is free of color unevenness and fluctuations in density can be obtained. In accordance with the second aspect of the present invention, when the foregoing 50 percent grain diameter, etc., are further specified, an alumina-based sintered material having even better grindability and high strength can be obtained. Furthermore, the present invention can provide a sintered product having, in combination very excellent grindability and high strength as defined in the fourth aspect of the present invention.

While the invention has been described in detail and with reference to specific embodiments thereof, it will be apparent to one skilled in the art that various changes and modifications can be made therein without departing from the spirit and scope thereof.

What is claimed is:

1. A sintered material comprising MgO in an amount of from greater than 0 to 1% by weight, CaO in an amount of from 0.02 to 1% by weight, $SiO_2$ in an amount of from 0.02 to 0.8% by weight and $Al_2O_3$ in an amount of at least 98% by weight, having a $SiO_2$ content ratio of less than 80 parts by weight based on 100 parts by weight of the sum of the weight of MgO, CaO and $SiO_2$, a 50 percent cumulative grain size distribution in diameter of from 4 to 15 μm, a 90 percent diameter of not more than three times the 50 percent diameter, and a porosity of 2% or less.

2. The sintered material as claimed in claim 1, wherein the sintered material is grindable and a maximum load current measured during grinding is not more than 1.0 A/mm, when the maximum load current during grinding is measured using a surface grinding machine having a wheel motor, a voltage of 220 V is applied to the wheel motor which is connected to an ammeter, the load current developed during grinding is measured under the following conditions, and the load current is obtained by dividing the measured current by the width of the wheel:

Grinding machine: precision surface grinding machine;
Grinding method: creep feed surface grinding;
Wheel: resin bond diamond wheel (grain size: #170, outer periphery: 205 mm, wheel width: 10 mm);
Number of wheel revolutions: 3,600 rpm;
Table feed rate: 60 mm/min;
Depth of cut: 3 mm/pass; and
Grinding distance: 30 mm.

3. A sintered material comprising MgO in an amount of from greater than 0 to 0.4% by weight, CaO in an amount of from 0.02 to 0.7% by weight, $SiO_2$ in an amount of from 0.02 to 0.8% by weight, and $Al_2O_3$ in an amount of at least 98% by weight, having a $SiO_2$ content ratio of less than 80 parts by weight based on 100 parts by weight of the sum of the weight of MgO, CaO and $SiO_2$, a 50 percent cumulative grain size distribution in diameter of from 6 to 12 μM, a 90 percent diameter of not more than three times the 50 percent diameter, a porosity of 2% or less, and a four-point flexural strength of not less than 300 MPa.

4. The sintered material as claimed in claim 3, wherein the sintered material is grindable and a maximum load current measured during grinding of not more than 0.5 A/mm, when the maximum load current during grinding is measured using a surface grinding machine having a wheel motor, a voltage of 220 V is applied to the wheel motor which is connected to an ammeter, the load current developed during grinding is measured under the following conditions, and the load current is obtained by dividing the measured current by the width of the wheel:

Grinding machine: precision surface grinding machine;
Grinding method: creep feed surface grinding;
Wheel: resin bond diamond wheel (grain size: #170, outer periphery: 205 mm, wheel width: 10 mm);
Number of wheel revolutions: 3,600 rpm;
Table feed rate: 60 mm/min;
Depth of cut: 3 mm/pass; and
Grinding distance: 30 mm.

5. The sintered material as claimed in claim 1, comprising $Al_2O_3$ in an amount of not less than 99.3% by weight.

6. The sintered material as claimed in claim 3, comprising $Al_2O_3$ in an amount of not less than 99.3% by weight.

7. The sintered material as claimed in claim 2, which exhibits a maximum load current during grinding of not more than 0.3 A/mm and a four-point flexural strength of not less than 320 Mpa.

8. The sintered material as claimed in claim 4, which exhibits a maximum load current during grinding of not more than 0.3 A/mm and a four-point flexural strength of not less than 320 Mpa.

9. The sintered material as claimed in claim 5, which exhibits a maximum load current during grinding of not more than 0.3 A/mm and a four-point flexural strength of not less than 320 Mpa.

10. The sintered material as claimed in claim 3, wherein the 50 percent cumulative grain size distribution in diameter is from 6 to 10 μm and the 90 percent diameter is from two to three times the 50 percent diameter.

11. A sintered material consisting essentially of MgO in an amount of from greater than 0 to 1% by weight, CaO in an amount of from 0.02 to 1% by weight, $SiO_2$ in an amount of from 0.02 to 0.8% by weight and $Al_2O_3$ in an amount of at least 98% by weight, having a $SiO_2$ content ratio of less than 80 parts by weight based on 100 parts by weight of the sum of the weight of MgO, CaO and $SiO_2$, a 50 percent cumulative grain size distribution in diameter of from 4 to 15 μm, a 90 percent diameter of not more than three times the 50 percent diameter, and a porosity of 3% or less.

12. The sintered material as claimed in claim 11, wherein the sintered material is grindable and a maximum load current measured during grinding is not more than 1.0 A/mm, when the maximum load current during grinding is measured using a surface grinding machine having a wheel motor, a voltage of 220 V is applied to the wheel motor which is connected to an ammeter, the load current developed during grinding is measured under the following conditions, and the load current is obtained by dividing the measured current by the width of the wheel:

Grinding machine: precision surface grinding machine;

Grinding method: creep feed surface grinding;

Wheel: resin bond diamond wheel (grain size: #170, outer periphery: 205 mm, wheel width: 10 mm);

Number of wheel revolutions: 3,600 rpm;

Table feed rate: 60 mm/min;

Depth of cut: 3 mm/pass; and

Grinding distance: 30 mm.

13. A sintered material consisting essentially of MgO in an amount of from greater than 0 to 0.4% by weight, CaO in an amount of from 0.02 to 0.7% by weight, $SiO_2$ in an amount of from 0.02 to 0.8% by weight and $Al_2O_3$ in an amount of at least 98% by weight, having a $SiO_2$ content ratio of less than 80 parts by weight based on 100 parts by weight of the sum of the weight of MgO, CaO and $SiO_2$, a 50 percent cumulative grain size distribution in diameter of from 6 to 12 μm, a 90 percent diameter of not more than three times the 50 percent diameter, a porosity of not more than 3%, and a four-point flexural strength of not less than 300 MPa.

14. The sintered material as claimed in claim 13, wherein the sintered material is grindable and a maximum load current measured during grinding of not more than 0.5 A/mm, when the maximum load current during grinding is measured using a surface grinding machine having a wheel motor, a voltage of 220 V is applied to the wheel motor which is connected to an ammeter, the load current developed during grinding is measured under the following conditions, and the load current is obtained by dividing the measured current by the width of the wheel:

Grinding machine: precision surface grinding machine;

Grinding method: creep feed surface grinding;

Wheel: resin bond diamond wheel (grain size: #170, outer periphery: 205 mm, wheel width: 10 mm);

Number of wheel revolutions: 3,600 rpm;

Table feed rate: 60 mm/min;

Depth of cut: 3 mm/pass; and

Grinding distance: 30 mm.

15. The sintered material as claimed in claim 11, wherein the $Al_2O_3$ is in an amount of not less than 99.3% by weight.

16. The sintered material claimed in claim 13, wherein the $Al_2O_3$ is in an amount of not less than 99.3% by weight.

17. The sintered material as claimed in claim 12, which exhibits a maximum load current during grinding of not more than 0.3 A/mm and a four-point flexural strength of not less than 320 Mpa.

18. The sintered material as claimed in claim 14, which exhibits a maximum load current during grinding of not more than 0.3 A/mm and a four-point flexural strength of not less than 320 Mpa.

19. The sintered material as claimed in claim 15, which exhibits a maximum load current during grinding of not more than 0.3 A/mm and a four-point flexural strength of not less than 320 Mpa.

20. The sintered material as claimed in claim 13, wherein the 50 percent cumulative grain size distribution in diameter is from 6 to 10 μm and the 90 percent diameter is from two to three times the 50 percent diameter.

* * * * *